(No Model.)
C. RICHTMANN.
WEIGHING SCALE.
No. 373,568. Patented Nov. 22, 1887.
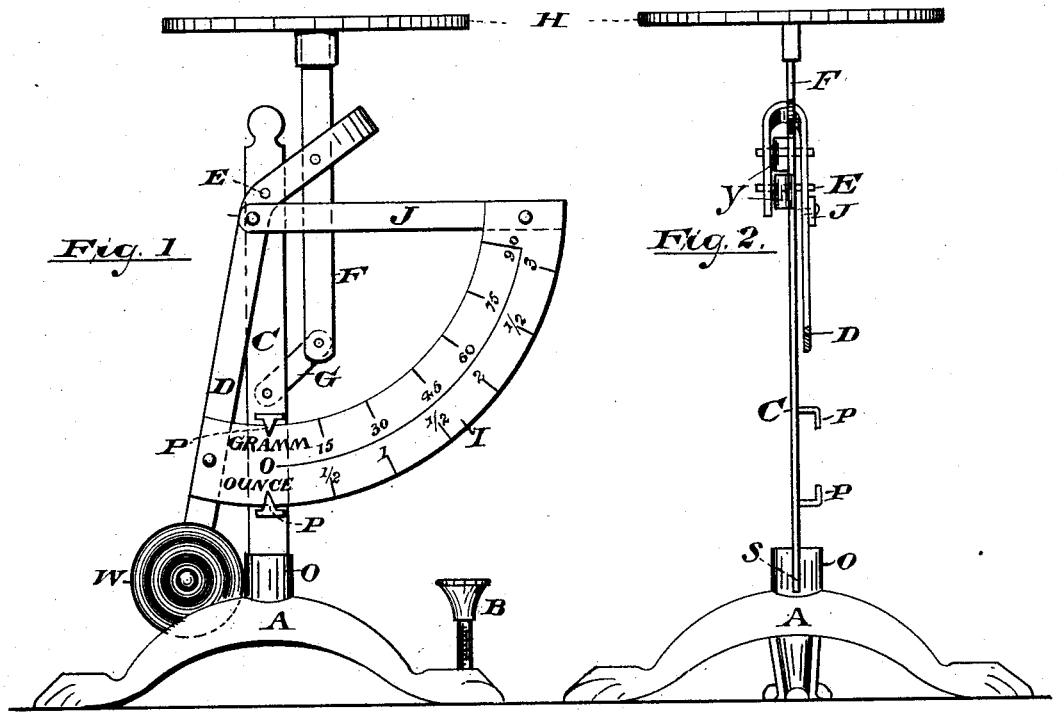
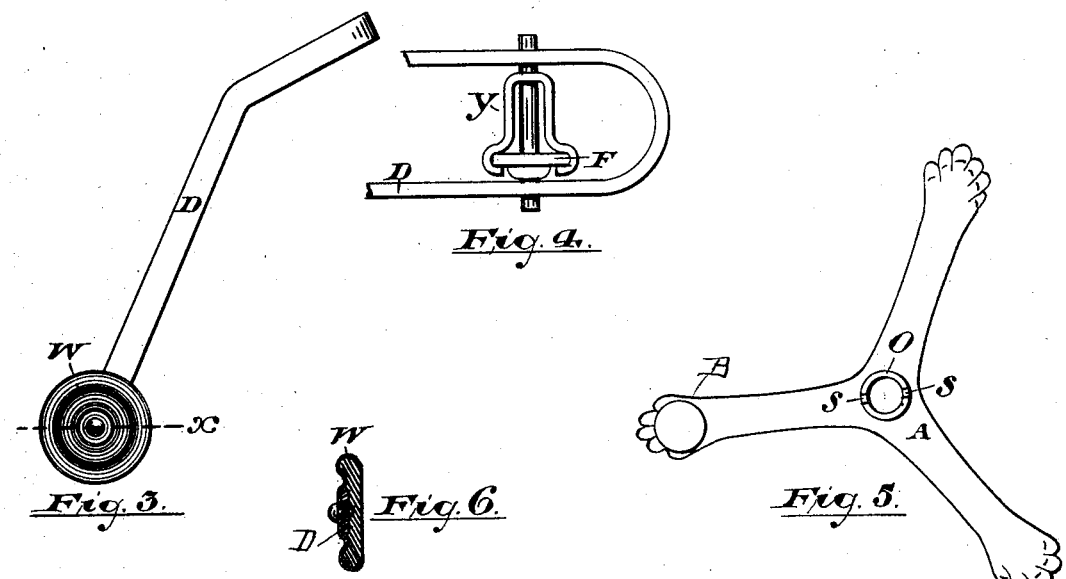
WITNESSES:
Horace E. Reeve
Oscar H. Michel
INVENTOR
Charles Richtmann,
BY Drake & G., ATT'YS.

UNITED STATES PATENT OFFICE.

CHARLES RICHTMANN, OF NEWARK, NEW JERSEY.

WEIGHING-SCALE.

SPECIFICATION forming part of Letters Patent No. 373,568, dated November 22, 1887.

Application filed March 14, 1887. Serial No. 230,831. (No model.)

*To all whom it may concern:*

Be it known that I, CHARLES RICHTMANN, a citizen of the United States, residing at Newark, in the county of Essex and State of New Jersey, have invented certain new and useful Improvements in Scales for Weighing Letters and other Light Parcels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a simple, cheap, effective, and durable scale for weighing letters and other light parcels or packages.

The invention consists in certain peculiar features of construction and in the combination of the several parts constituting said scales, hereinafter described, and pointed out in the claims.

Referring to the accompanying drawings, in which like letters of reference indicate corresponding parts in each of the several figures, Figure 1 represents a front elevation of a letter-scale embodying my improvements. Fig. 2 is an elevation showing a view at right angles to that of Fig. 1. Fig. 3 is a detail view of one of the parts of said scales. Figs. 4 and 5 are detail views, and Fig. 6 is a section through line X of Fig. 3.

In said drawings, A represents a tripod, one foot of which is provided with an adjusting-screw, B, the purpose of which will be further disclosed hereinafter.

C represents a post or standard, and D a weighted arm or lever pivotally adjusted upon said post at E. The upper end of said weighted arm projects at an angle from the main portion thereof, and is bent or doubled, so as to form a yoke, as indicated in Figs. 2 and 4.

F represents a bar or support, which is pivotally connected to a rod or strap, G, which is also pivotally connected with the standard C, as will be seen by referring to Fig. 1.

H represents a platform detachably connected with said support F at the top.

I represents a thin graduated quadrantal plate representing half-ounce marks, and also marks indicating the metrical system, so that either or both systems of weighing may be used at pleasure. Said plate is fastened at one end to the main portion of said weighted bar or lever, and at the other to an arm, J, projecting from said weighted arm or lever, as clearly shown in said Fig. 1. Said quadrantal plate moves or works between two pointers, P, which serve to indicate the weight of the letter or package being weighed.

The weight W, which is attached to said weighted arm, is of peculiar construction and is made as follows: A plate of very thin metal is struck up in a cup form, and is filled in at the back with lead or any other appropriate material and the edge bent to hold said filling in place, the front of the weight being ornamented to suit the taste. The whole is secured to the weighted arm by means of a rivet or otherwise, as will be understood by referring to Fig. 6. In order to secure broad bearings for the pivotal connections of the weighted arm with the said standard C and support F, I form yokes Y, Fig. 4, of thin sheet metal, which are rigidly clamped to said standard and support in suitable recesses formed therein, as indicated in said Fig. 4, thus affording broad and steady bearings for said parts, as already stated.

The operation of said scales is as follows: The tripod, being set upon a table, is adjusted by means of the set-screw B, so that the pointers indicate zero. The letters or other package to be weighed are then placed upon the platform, when the settling of the same lifts the weighted arm upward, when the weight of said package will be indicated in either system by means of the pointers P and the graduations on the quadrantal plate, as will be readily understood. The standard C, already referred to, is removably secured in a socket in said tripod, which socket is formed in a projection, O, having a slot, S, cut therein, into which the end of said standard C is nicely fitted, as will be understood by reference to Figs. 1, 2, and 5.

All the parts, except the tripod, the platform, and pivots, are preferably made of flat wire, whereby I am enabled to make the device very light, and also to secure a nice adjustment of the several parts. The standard, as will be observed, is capable of being readily attached to and detached from its support at pleasure, as is also the platform in respect to its support, thereby greatly facilitating the packing of the device for transportation.

Having thus described my invention, what I claim as new, and wish to have secured by Letters Patent of the United States, is—

1. In a scale of the kind described, the combination, with the base A, having a projecting socket, O, provided with slots S S on opposite sides thereof, and a standard, C, formed to be placed in the socket O, and having projections which lie in the slots, and being provided with the pointers P, of a curved or bent lever, D, pivoted at the bend to the standard C, and having the upper end curved or formed into a yoke, as described, and the lower end projected back of the standard and provided with a weight, a quadrant, I, secured to the lever D, and a platform, H, rod F, supporting the platform, pivoted in the yoke of lever D, and a link, G, connecting the lower end of the rod F to the standard C, as set forth.

2. The combination, in a scale of the character described, of a standard, C, provided with pointers P, a bent weighted lever, D, pivoted to said standard C, having its upper end formed into a yoke and carrying a graduated quadrant, I, a platform, H, and a rod, F, supporting the platform and pivotally connected with said yoke and with the standard C by means of a link, G, said parts being arranged with relation to one another and adapted to operate substantially as and for the purpose set forth.

In testimony that I claim the foregoing I have hereunto set my hand this 5th day of March, 1887.

CHARLES RICHTMANN.

Witnesses:
OLIVER DRAKE,
OSCAR A. MICHEL.